April 9, 1935.  W. H. NICHOLS  1,997,228
CONJUGATE CURVE GENERATOR
Filed July 22, 1932   3 Sheets-Sheet 1
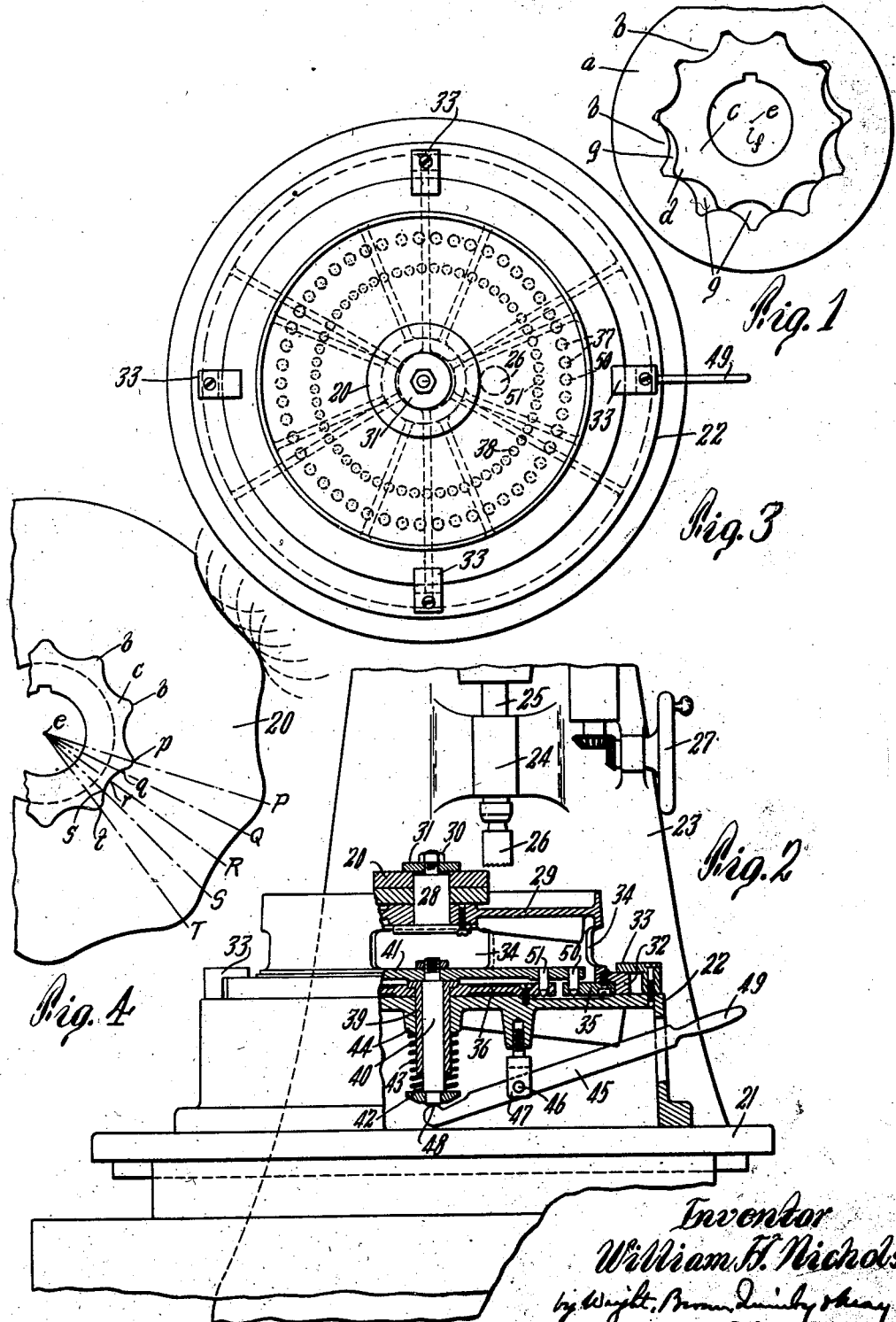
Inventor
William H. Nichols
by Wright, Brown, Quinby & May
Attys

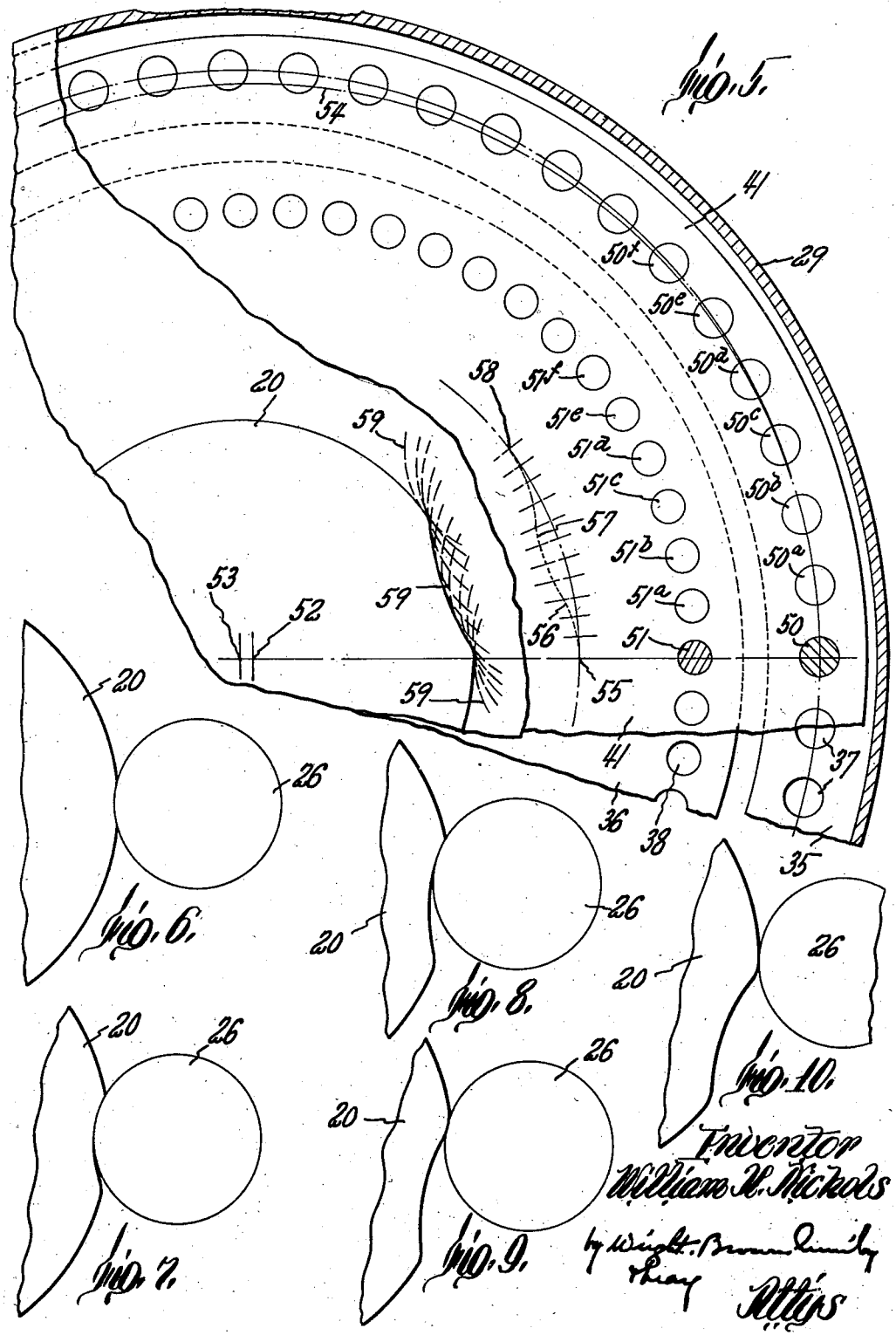

April 9, 1935. W. H. NICHOLS 1,997,228
CONJUGATE CURVE GENERATOR
Filed July 22, 1932   3 Sheets-Sheet 3

Inventor
William H. Nichols
by Wright, Brown, Quinby & May
Att'ys

Patented Apr. 9, 1935

1,997,228

UNITED STATES PATENT OFFICE 1,997,228

CONJUGATE CURVE GENERATOR

William H. Nichols, Waltham, Mass.

Application July 22, 1932, Serial No. 624,015

11 Claims. (Cl. 90—1)

The present invention is concerned with a machine or apparatus for generating curves which bear a prescribed relation or conjugacy to other curves. In its embodiment here illustrated it is related to my companion patent application Ser. No. 624,013, filed of even date herewith, for Rotors and rotor generating machines; and its specific object in that connection is to generate the outline of the internal rotor of a rotary pump, and related curves suitable for cams to be used in the rotor cutting machine of application Serial No. 624,013. More generically it is concerned with the generation of any curves having lobes spaced around a central point and merging smoothly with one another, conjugate to another curve with lobes spaced about a central point eccentric to the one previously referred to.

In carrying out the generating action a differential motion is effected between the member, part or work piece on or in which the curve is to be generated, and a cutting tool, or equivalent scribing or indicating element, equivalent to the relative motion between two rotors, one of which has the outline of the curve to be generated, and the other of which has a conjugate outline. The invention consists primarily in means for effecting relative movement of this character, and includes further, specifically in the present embodiment, a suitable cutting tool and means for supporting a work piece in position to be cut by such tool on the outline of the generated curve.

I will now proceed to describe the invention in terms of a specific embodiment adapted to generate the curve of a specific rotor, or a related curve which may be designated as the radial equidistant of the rotor curve. The rotor thus referred to is the internal member of a rotary pump or motor unit, such unit comprising a ring rotor having internal lobes and an internal rotor having lobes on its outer circumference, the number of which differs by one from the number of lobes in the outer rotor, and the form and proportions of which are such as to apply or receive rotational impulse to or from the outer rotor and to maintain continuous sliding engagement with the contiguous surfaces of the outer rotor in passing between successive positions of full mesh. It is to be understood, however, that this specific description is illustrative of the principles of the invention rather than a limitation to any specific embodiment.

In the illustrative drawings,—

Fig. 1 is a plan view of a rotor unit of the type referred to;

Fig. 2 is a partial front elevation and partial section of a form of apparatus embodying the invention for generating curves of the nature indicated;

Fig. 3 is a plan view of the work supporting means of the apparatus shown in Fig. 2;

Fig. 4 is a coaxial projection of the inner rotor of the pump unit shown in Fig. 1 and a work piece in the course of being generated with an outline which is a curve radially equidistant to the curve of the rotor;

Fig. 5 is a partial plan and horizontal section of the work holding means, and is in part also a diagram of the steps performed in generating a prescribed curve;

Figure 11:
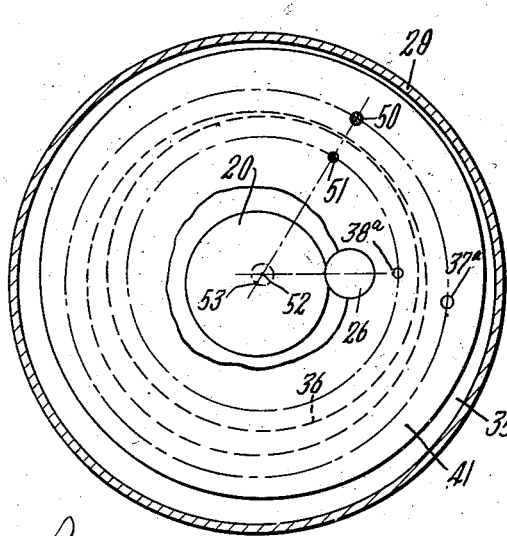

Figs. 6–10 inclusive are fragmentary views of a work piece and cutter illustrating progressive steps in the generation of the curve;

Figs. 11–15 inclusive are horizontal sectional plan views, partially diagrammatic, of the work holder, showing positions of the latter corresponding to Figs. 6–10 inclusive respectively.

Like reference characters designate the same parts wherever they occur in all the figures.

The specific rotary pump referred to in the introduction to this specification, and also in my companion application referred to, consists of an outer or ring shaped rotor $a$ having a circular outer circumference and a concentric series of internal lobes $b$; and an inner rotor $c$ having external lobes $d$, one less in number than the lobes $b$. In the simultaneous rotation of these rotors about their respective centers $e$ and $f$, the lobes $d$ progressively enter into full mesh in the spaces between the lobes $b$, one after the other, and in passing from one full mesh position to the next they slide over the surfaces of the lobes $b$ and maintain contact therewith. The intermediate spaces $g$ are thus alternately enlarged and contracted, serving to draw in and expel fluid through ports in the casing wherein the unit is mounted, when used as a pump or compressor. Conversely, the unit may be used as a rotary engine by admitting fluid under pressure to one port and exhausting it from the other. However, the principles of the rotor unit are not new or original with me, but my purpose has been to devise means for producing them on a commercial scale with such perfection of accuracy as to enable any one of the internal rotors of a given form and dimension to fit and run correctly with any conjugate outer rotor of a commercial lot, in the absence of special fitting, burnishing or running in operation. I have simplified the problem by making the lobes $b$ as segments of cylinders of equal radius, spaced equally from and equiangularly about, the center $f$, and with a spacing between their own centers greater than the diameters of their individual arcs, in a measure sufficient to permit the desired depth of meshing penetration by conjugate lobes having a width at the tip great enough to maintain a good sealing contact while passing between successive full mesh positions.

The more particular problem solved by that phase of the invention herein disclosed is to generate the circumferential curves of the inner rotor conjugate to the interior curve of the ring rotor; and still more particularly to produce the cams of the rotor generating machine disclosed in my said application Serial No. 624,013.

The relation of such cam to the rotor is illustrated in Fig. 4, which shows them in coaxial projection. The partially completed cam is designated as 20 and is the work piece shown in the other views of the drawings. In order to obtain greater accuracy and smoothness of operation in finish cutting the rotor, the cam is preferably made of substantially larger diameter than the rotor $c$, and its outline bears a definite relation to the outline of the rotor, being radially equidistant at all points from corresponding points of the rotor. That is, on any radial lines cutting the cam periphery at points P, Q, R, S and T, and the rotor outline at points $p$, $q$, $r$, $s$ and $t$, the distances P—$p$, Q—$q$, R—$r$, S—$s$ and T—$t$ are all equal. Thus, while the radial differences between high and low points in the cam outline are equal to those of the rotor outline, the ratios of these differences to the radii of the cam are smaller and the linear distance between corresponding points is greater, wherefore the undulations of the cam outline are more gentle and gradual.

The machine which I am now about to describe is adapted, by adjustment, to generate the outline of the cam 20, or that of the rotor $c$, or any other radial equidistant of the rotor outline, within the limits of the capacity of the machine for adjustment and for substitution of suitable cutting or scribing tools.

The frame or base of the machine may be of any character and construction. It is here shown as having a bed 21 on which a table 22 is mounted, and a column 23 having a bearing 24 in which a cutter spindle 25 is mounted. A milling cutter 26 with teeth on its ends and sides is shown as mounted on the lower end of spindle 25 above the table, the axis of the spindle and cutter being perpendicular to the supporting surface of the table. The machine is also equipped with means for rotating the spindle and for withdrawing and feeding it endwise, which may be of any known or other suitable character. Mechanisms and appliances suitable for these purposes are so well and universally known to all skilled in the art of machine construction that illustration and explanation herein are unnecessary to inform artisans and designers how to embody the invention in commercial machines. The operating end of the means for moving the cutter spindle axially is indicated in Fig. 2 as a hand wheel 27. The essential novelty of the present invention is embodied in means for giving to the work the required generating movements relatively to the cutter or an equivalent scribing or marking tool.

The work piece 20, or a plurality of duplicate work pieces, is or are fitted to an arbor 28, secured to and rising from, a work holder 29, and clamped to the arbor by a nut 30 through an interposed washer 31. The work holder is a sufficiently rigid and massive frame or bridge rising from an annular bottom part 32 which rests and is movable freely on the supporting surface of the table 22. Retainers 33 are secured to the table and constructed to overlap the bottom flange of the work holder, merely to retain the latter within limits. They are not clamps and do not obstruct the movement of the work holder in any way except to limits outside of its normal movements in generating the curve. Openings 34 are provided in the sides of the work holder to permit access by the workman to interior parts.

A ring 35 is secured to the bottom part of the work holder; and a plate 36 is secured to the top of the table within this ring. The inner circumference of ring 35 is enough larger than the circumference of plate 36 to permit the movements of the work holder later described. Circular holes 37, equally spaced from one another in a circular row concentric with the work holding arbor 28, are made in the ring 35, and circular holes 38 are made in the plate 36, equally spaced apart and equidistant from the center of the plate. In practice these holes are drilled, bored and reamed with an accuracy in diameter and spacing within limits of one ten-thousandth of an inch. The number of the holes 37 is a multiple of the number of lobes to be provided in the rotor $c$; and the number of the holes 38 is a multiple of the number of lobes in the outer or ring rotor $a$. That is, the ratio of the number of holes 37 to the number of holes 38 is equal to the ratio of the number of lobes $d$ to the number of lobes $b$. In the present specific illustration the rotor $c$ has ten lobes, and the rotor $a$ eleven; and there are fifty of the holes 37, and fifty-five of the holes 38. These specific values may be varied for rotors of more or fewer lobes, and according as the outer or the inner rotor has the larger number of lobes; and of course the multiple by which the numbers of holes are related to the numbers of lobes may be greater or less than five. I have here provided as many holes as possible, consistent with adequate strength and rigidity of the parts having the dimensions which I have adopted for this machine, in order to make the successive generating steps very short.

In the center of the table 22 and plate 36 there is rigidly secured a tubular guide 39 in which a shaft 40 is closely fitted for rotary and endwise sliding movement. The opposite ends of this shaft protrude from the guide. On the upper end of the shaft is fitted and clamped a plate 41 which overlies the plate 36, and its circumference extends across the inner boundary of ring 35. A collar 42 is secured to the lower end of shaft 40 and a spring 43 surrounds the guide 39 and is confined between collar 42 and a shoulder 44 on the under side of the table top. This spring is stiff and powerful enough to perform the driving function presently described. A lever 45 is pivoted at 46 to a bracket 47 depending from the table top. One arm of the lever extends under the shaft 40 and has a rounded contact surface 48 to engage the end of the shaft, while the other arm of the lever projects through an opening in the side of the table and terminates in an operating handle 49.

The plate 41 carries two circular rows of pins 50 and 51. The pins 50 of the outer row are arranged on a circumference of the same diameter as the circle in which the holes 37 are arranged, and are spaced apart with the same spacing as the holes 37, or a multiple of this spacing. They are of cylindrical form and of dimensions exactly fitting the holes 37, except as to their extremities, which are tapered or beveled. The circumference on which pins 51 are arranged coincides in axial projection with the circle of the holes 38, and the spacing between these pins is equal to, or a multiple of, the spacing between holes 38. The pins 51 are likewise cylindrical and fitted accurately to the holes 38, except as to their extremities, which are tapered. The circle of the pins 50 is eccentric to that of the pins 51, and to the shaft 40, by an amount equal to the eccentricity between the rotors a and b. In Figs. 5 and 11–15, 53 designates the center of the row of pins 50, while 52 designates the center of the row of pins 51 and holes 38, and the axis about which shaft 40 and plate 41 are adapted to rotate. In the machine as built with respect to the pump unit shown in Fig. 1, the distance 52—53 is equal the distance e—f.

When the plate 41 is lowered as far as it will go, the pins 50 and 51 occupy respectively their holes 37 and 38 far enough to fill them without backlash. Depressing handle 49 causes the plate 41 to be raised and the pins withdrawn clear of the ring 35 and plate 36, whereupon the plate 41 may be rotated by hand (by the workman reaching in through any of the spaces 34) far enough to enable the tapered ends of the pins each to enter the next hole of the respectively adjacent series. When the handle is released or eased up, spring 43 then forces the pins fully into their holes, and in doing so causes the tapered ends of pins 50 to give an increment of sliding movement to the ring 35 and work holder. Also the tapered ends of pins 51 cause an automatic accurate alinement with their holes 38, simplifying the task of the operator. Spring 43 is powerful enough to overcome the inertia and friction of the work holder by the wedging action of these pins.

It will be convenient to apply distinctive names to the parts of the work propelling mechanism just described. The plate 36 may be considered as an abutment plate, or more generically as a reaction member, since it sustains the reaction of the propelling thrusts for the work holder. Plate 41 may be considered as a transmission plate or forwarding member, and the pins 50 and 51 as transmission or propelling wedges. Ring 35 is the driven member of the mechanism receiving and applying to the work holder the propulsive thrusts. The rims of the holes in the plate and ring are abutments for respectively sustaining the reaction and receiving the propelling action of the tapered ends of the pins. Spring 43 may be considered as the prime mover or power element of the mechanism which, after receiving energy applied manually through the lever 45, exerts the force which moves the work holder. The whole constitutes the differential mechanism by which a rolling movement is imparted to the work holder equivalent to that of the inner rotor c when rolled in a planetary manner within the outer rotor a, the latter being held stationary.

In operation the blank work piece is secured to the arbor when the work holder is locked by the transmission plate and pins, and the cutter is fed across the rim of the work. With the use of a cutter having end milling teeth, the first cut may be taken with the work holder in any of its positions, either at the outermost point of a lobe, or at any intermediate point between lobes. Thereafter the transmission plate is raised, turned enough to bring its propelling pins 51 into the next adjacent holes 38, and released; the successive rotational steps of the plate being always in the same direction.

The relative positions of the parts in generating the curve from the top of one lobe to the corresponding point on the next are illustrated by Fig. 5. Assuming that the transmission plate 41 is turned counterclockwise by the distance between successive holes 38 at each step of its movement, then the pin designated 51 in Fig. 5 will come successively into the positions indicated 51a, 51b, 51c, etc., and the pin 50 will enter, one after the other, the holes 37 which are alined with the positions 50a, 50b, 50c, etc. As each step of the pin 50 is shorter than the distance between holes 37 and its rotation around the center 52 is in a path concentric therewith shown by the broken line 54, which is eccentric to the row of holes 37, and the other pins of this series likewise shift in paths eccentric to these holes, all the pins cooperate in giving an increment of rotation to the work holder and work in the clockwise direction about the axis 53, and an increment of planetary movement of the entire work holder around the axis 52 in the counterclockwise direction. The orbit of this planetary motion is small, its radius being equal only to the eccentricity of the work holder to the fixed center, i. e., the eccentricity of centers 52—53 and e—f.

All the other pins of both series act conjointly to the same effect. It is not essential that there be as many of the pins 50 and 51 as there are holes 37 and 38 respectively, but it is desirable that there be a relatively large number of such pins, spaced regularly around the respective axes, for reasons well understood by workmen skilled in the art. In the course of one complete rotation of the transmission plate 41, the work holder makes a complete revolution in its orbit and at the same time rotates about its own axis through the angle between two adjacent lobes. The undulating dotted line 55, 56, 57, 58 represents the position relatively to the work holder of the axis of the cutting tool at successive stages in one of the cycles above described, while the broken arcs 59 show corresponding locations of the circumference of the cutter.

Figure 12:
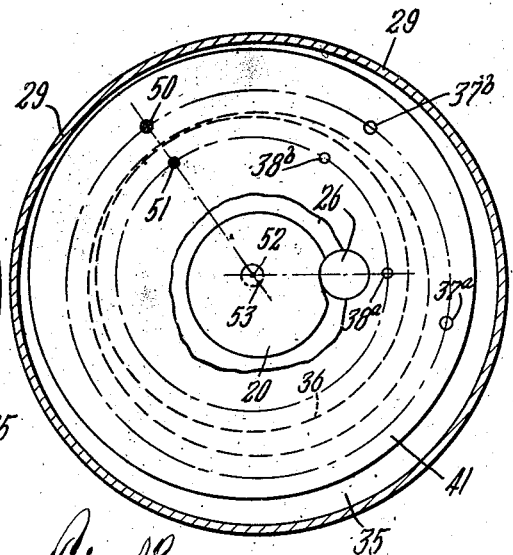
Figure 13:
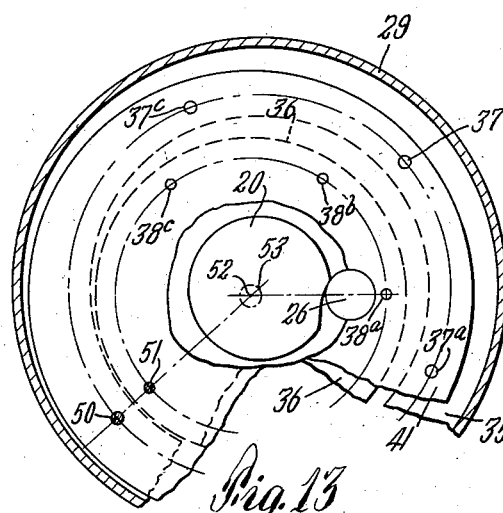
Figure 14:
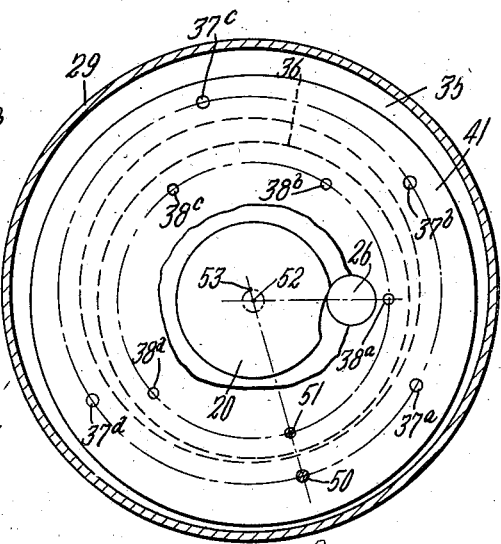
Figure 15:
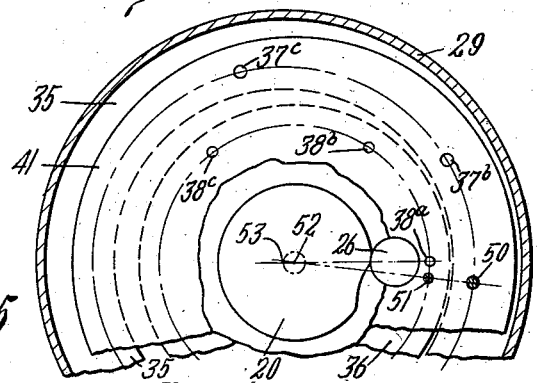

Fig. 6 shows the position of the work with respect to the cutter at the tenth step of transmission, and Fig. 11 shows in a diagrammatic way, on a small scale and with exaggeration of the eccentricity, the corresponding positions of the entire transmission mechanism. Figs. 7 and 12 show the same characteristics at the twentieth position of the cycle; Figs. 8 and 13 the positions at the thirty-fifth step; Figs. 9 and 14 the same elements at the forty-fifth step; and Figs. 10 and 15 the position at the last step of the cycle before return of the transmission plate to the position shown in Fig. 5. In Figs. 11–15 the pins particularly designated by the numerals 50 and 51 in Fig. 5 are shown in different positions, while the small circles 38a, 38b designate the positions of the several holes 38 occupied by the pin 51 in these positions and the small circles 37a, 37b, etc. represent the locations of the holes 37 occupied at the same times by the pin 50, and the shift of these locations.

Substantially the same mechanism is used when the number of lobes of the inner rotor is greater than that of the outer rotor; but then the number of holes 37 in the driven ring is correspondingly greater than the number of holes 38 in the abutment plate, and the work holder is rotated in the same direction as the transmission plate, while its orbital rotation is in the opposite direction.

So far as concerns the generating principle, the cutter may have any radius of curvature which is not greater than the shortest radius of the concave parts of the generated curve; and except for the correlation of this invention with my companion application for rotor cutting machine, the cutter which outlines the curve need not be a rotating cutter, but might be a planing cutter. However, the correlation with the said companion invention requires the active part of the cutter to have a radius small enough to permit as many rolls as there are lobes of the outer pump rotor, which rolls are of equal radius to the cutter, to be arranged in a circular series with equidistant spacing in simultaneous engagement with the circumference of the cam generated as here described. Such rolls, in my related rotor cutting machine, cooperate with the cams to impart a compound motion between a rotor blank and a grinding wheel to finish rotors such as the rotor c of Fig. 1.

It involves merely adjustment of the table 22 and selection of a cutter of suitable radius to generate by this machine either the exact outline of the curve conjugate to the rotor a, or any other radially equidistant curve. Table 22 is shiftable on the base to place the axis 52 at any prescribed distance, within wide limits, from the cutting tool. In order to generate the identical curve of rotor c, a cutting tool of the same radius as the lobes b is taken, and the table adjusted to bring the axis 52 at the same distance from the cutter as the distance of lobes b from the center of rotor a. Such adjustments may be made manually and determined accurately with the aid of measuring instruments and gauges known and used by artisans skilled in the use of precision methods of manufacture.

What I claim and desire to secure by Letters Patent is:

1. A mechanism for rotating and revolving a work piece for the generation of a rotor periphery having a number of lobes differing by one from the number of lobes in a given curve, comprising a work holder movable angularly and translatively, a fixed reaction member, a transmission member rotatable about a fixed axis, a driven member connected to the work holder, and propelling means carried by the transmission member and engageable progressively with the reaction and driven members for rotating the latter about an axis eccentric to the axis of the transmission member and simultaneously giving the work holder an orbital movement about the axis of the transmission member.

2. A transmission mechanism for giving a compound movement of rotation and revolution to a work holder, comprising a reaction member having a circular series of equally spaced abutments, a transmission member rotatable about the axis of said abutments and having propelling members adapted to engage with and to be located by said abutments successively in the course of rotation of the transmission member in one direction, a driven member connected to the work holder having a circular series of equally spaced abutments differing in number from the number of abutments in the reaction member, and propelling members carried by the transmission member for engagement successively with different ones of the abutments of the driven member in the course of rotation of the transmission members, the last named propelling members being located on a circle eccentric to the first series of propelling members.

3. A transmission mechanism for giving combined rotational and planetary movement to a work holder, comprising a support, a reaction member having a circular series of equally spaced abutments stationary with respect to such support, a driven member freely movable on the support, surrounding the said reaction member, and having a circular series of thrust receiving abutments differing in number from the reaction abutments, a transmission plate and two series of propelling elements carried thereby; the transmission plate being rotatable in fixed location around the center of the series of reaction abutments and being axially movable to bring its propelling elements into and out of engagement with the abutments of the reaction member and the driven member, its propelling elements of one series being spaced on a circle coaxial and of equal radius with the circle of reaction abutments, and its second series of propelling elements being arranged on a circle eccentric to the first series and of radius equal to that of the circle of abutments on the driven member.

4. A transmission mechanism for the purpose set forth, comprising a table having a supporting surface, a work holder resting movably on said surface and having a thrust receiving ring, a reaction plate secured to the table within said ring and containing a circular series of holes, the before named ring having a circular series of holes surrounding the first series but with a different angular spacing than those of the first series, and a transmission plate mounted for rotation about an axis containing the center of the first series of holes and being also axially movable toward and away from the reaction plate, said transmission plate having two series of propelling pins of which the pins of one series are dimensioned and positioned to fit the holes of the first series, and the other pins are positioned on a circumference eccentric to the other series and are dimensioned and positioned to enter and fit the holes of the driven ring.

5. A transmission mechanism as set forth in claim 4, in which the propelling pins of the series which engage the driven ring are tapered to enter and apply wedging thrust to the driven ring.

6. An apparatus for use in generating curves having a number of lobes conjugate to another curve having a different number of lobes for meshing engagement when rotating on axes eccentric to one another, comprising a support, a work holder movable on said support and including a ring having a series of holes equally spaced about and equidistant from a point substantially at the center of the ring, a fixed plate having a series of equally spaced holes equidistant from a point in the neighborhood of the center of the first series, the numbers of holes of the two series being relatively proportional to the numbers of lobes of the two curves before mentioned, and a transmission plate movable bodily in, and angularly about, an axis through the center of the series of holes in the reaction plate, the transmission plate having a series of pins at an equal distance with the holes in the reaction plate from said axis, and an eccentric series of pins arranged on a circle of equal radius with that of the holes in the driven ring, the pins being accurately fitted to the respectively adjacent holes and having tapered ends for entering said holes and propelling the driven ring after having been withdrawn and shifted angularly.

7. An apparatus as claimed in claim 6 comprising further means for withdrawing the transmission plate and its pins from the reaction plate and driven ring, and means for exerting force on the ring to cause entrance of the pins into their respective holes.

8. A machine for generating a cam with a perimeter radially equidistant from the perimeter of an inner rotor having a number of equal lobes to mesh with an outer rotor having a different number of lobes when the rotors turn about eccentric axes, comprising a work holder, a support for mounting said work holder with provision for movement rotatably and translatively, a reaction member fixed to said support and having a circular series of equally spaced reaction abutments, the center of which series is at a fixed distance from the cutting tool, a ring connected to the work holder and having a series of propelling abutments arranged equidistantly from and equiangularly around the axis of the work holder, the ratio of the number of reaction abutments to the number of thrust abutments being equal to the ratio between the number of lobes in the outer rotor and those of the inner rotor, and a transmission member having two series of propelling elements arranged on circumferences which are eccentric to one another equal to the eccentricity of the rotors, and the diameters of which are equal respectively to the diameters of the series of reaction abutments and the series of propelling abutments, said transmission member being rotatable about an axis which includes the center of the series of reaction abutments and the center of the series of propelling elements which coact with said abutments, and being further movable to bring the propelling elements into and out of engagement with the coacting abutments.

9. A machine for generating a cam for use in the generation of an inner rotor with a regular series of lobes conjugate to a different number of lobes of an outer rotor when the two rotors turn about eccentric axes, comprising a rotatable milling tool having a diameter equal to that of any roll of a circular series of like rolls equal in number to the lobes of the outer rotor for supporting such cam, a stationary series of abutments arranged in a circle around an axis at a distance from the axis of the milling tool equal to the distance of the axes of said rolls from the center which they surround, a transmission member rotatable about the axis of said series of abutments having elements engageable with the abutments successively upon rotation of the transmission member, a second series of propelling elements carried by the transmission member on a circle eccentric to that of the first series with an eccentricity equal to the eccentricity of the rotors, and a circular series of propelling abutments connected to the work holder coaxially with the work piece for successive engagement with the propelling elements of the second named series and the number of which is in the same ratio to the number of reaction abutments as the number of lobes of the inner rotor to the lobes of the outer rotor.

10. A mechanism for generating a curve having a number of equal lobes equally spaced from one another and equidistant from a common center, conjugate to another curve having a number of lobes differing by one from the number of lobes of the first curve, equally spaced about and equidistant from a different center; comprising a work holder, means for marking a legible outline on a work piece carried by said work holder, a holder for said marking means, one of said holders being movable relatively to the other holder rotatably, and translatively in a plane transverse to the axis of such rotative movement, a fixed reaction member, a transmission member rotatable about a fixed axis, a driven member connected to the movable one of said holders, and propelling means carried by the transmission member and engageable progressively with the reaction and driven members for rotating the latter about an axis eccentric to the transmission member and simultaneously giving the movable holder an orbital movement about the axis of the transmission member.

11. A mechanism for imparting compound movements of rotation and translation to a driven member as and for the purpose set forth, which consists of a fixed reaction member having a circular series of equally spaced abutments, a driven member having a series of abutments differing in number from the abutments of the first series equally spaced in circular series of different diameter from that of the first named series of abutments, and a transmission member having two series of propelling members fixed with relation to one another, one series of propelling members being spaced equally to those of the first named series of abutments, and the other series of propelling members being spaced equally to the abutments of the second series and the two series of propelling members being eccentric to one another; the transmission member being shiftable to bring different ones of its propelling members into thrust and reaction engagement with different ones of the two respective series of abutments.

WILLIAM H. NICHOLS.